(12) United States Patent
Kim

(10) Patent No.: US 7,704,013 B2
(45) Date of Patent: Apr. 27, 2010

(54) PREFABRICATED BREAKWATER

(76) Inventor: Simon Myungkil Kim, 109-602 Samsung Raemian Apt., 256-1 Guro 3-dong, Guro-gu, Seoul (KR) 152-767

( * ) Notice: Subject to any disclaimer, the term of this patent is extended or adjusted under 35 U.S.C. 154(b) by 0 days.

(21) Appl. No.: 12/092,444

(22) PCT Filed: Jun. 21, 2006

(86) PCT No.: PCT/KR2006/002389
§ 371 (c)(1), (2), (4) Date: May 2, 2008

(87) PCT Pub. No.: WO2007/052880
PCT Pub. Date: May 10, 2007

(65) Prior Publication Data
US 2008/0292403 A1 Nov. 27, 2008

(30) Foreign Application Priority Data
Nov. 5, 2005 (KR) .................. 10-2005-0105724

(51) Int. Cl.
*E02B 3/06* (2006.01)
(52) U.S. Cl. .................. 405/33; 405/30; 405/31; 405/25; 405/35
(58) Field of Classification Search .................. 405/21, 405/25, 30, 31, 33, 34, 35
See application file for complete search history.

(56) References Cited
U.S. PATENT DOCUMENTS
2,099,249 A * 11/1937 Wood .................. 405/33
3,379,015 A * 4/1968 Macks .................. 405/33
4,118,937 A * 10/1978 Mansen .................. 405/30
4,189,252 A * 2/1980 Inman .................. 405/33

(Continued)

FOREIGN PATENT DOCUMENTS
FR 2 731 725 3/1995

(Continued)

OTHER PUBLICATIONS
"International Search Report" for PCT/KR2006/002389.

*Primary Examiner*—Frederick L Lagman
(74) *Attorney, Agent, or Firm*—Westman, Champlin & Kelly, P.A.

(57) ABSTRACT

The present invention relates to a breakwater, particularly, to a prefabricated breakwater which is assembled in a stepped manner, having the improvements in the construction workability and prevention of the marine pollution due to the permeability of ocean currents together with the original wave dissipation function for the protection of ships or all kinds of the establishments in the harbor. The prefabricated breakwater according to the present invention comprises a plurality of unit blocks, each of which has engaging grooves at the constant distance at the top and bottom thereof, the unit blocks being assembled to form a current passage; a dissipating blocks in a plate shape having a plurality of engaging grooves at the tap and bottom or sides thereof at the constant distance; the unit blocks and dissipating blocks being assembled in a crosswise and longitudinal directions to form an hexagonal block assembly; the dissipating blocks being assembled in a stepped manner so as to be higher in an open sea direction; and the hexagonal block assemblies being connected to form a breakwater.

4 Claims, 3 Drawing Sheets

U.S. PATENT DOCUMENTS

| | | | |
|---|---|---|---|
| 4,341,489 A * | 7/1982 | Karnas | 405/35 |
| 5,074,707 A * | 12/1991 | Greene | 405/27 |
| 5,122,015 A * | 6/1992 | Shen | 405/30 |
| 5,599,136 A * | 2/1997 | Wilke | 405/21 |
| 5,803,660 A * | 9/1998 | Warren et al. | 405/25 |
| 6,234,715 B1 * | 5/2001 | Ono | 405/21 |
| 2008/0310919 A1 * | 12/2008 | Kyung | 405/21 |
| 2009/0022548 A1 * | 1/2009 | Bishop | 405/33 |

FOREIGN PATENT DOCUMENTS

GB  2 283 265  5/1995

* cited by examiner

PREFABRICATED BREAKWATER

TECHNICAL FIELD

The present invention relates to a breakwater, particularly, to a prefabricated breakwater which is assembled in a stepped manner, having the improvements in the construction workability and prevention of the marine pollution due to the permeability of ocean currents together with the original wave dissipation function for the protection of ships or all kinds of the establishments in the harbor.

BACKGROUND ART

Generally, a breakwater is a structure to dissipate the waves from the open sea to the inland sea, thereby protecting the facilities at a harbor or the shores.

The conventional breakwaters were constructed merely to block the seawater currents from the open sea to the harbor side or shore for the primary purpose for protection of the waves surged to harbor, which were built in an upright structure using a caisson or a rubble mound.

However, the currents between the inside and outside seawaters of the harbor were blocked by the breakwater, which led to the serious problems of the marine pollutions caused by the deposition of garbage to the seabed and the deterioration of beaches.

In order to solve theses problems, the permeable breakwaters were proposed.

The typical examples of the permeable breakwaters in an upright type are disclosed in the Korean Utility Model Registration No. 303,600 and Korean Patent Registration No. 374,181.

The Korean Utility Model Registration No. 303,600 discloses a permeable upright breakwater having a base part with a plurality of conduits, through which a tide may flow.

However, although the tide may pass the upright breakwater, but there are problems of the complicated method of construction, the insufficient wave dissipation function and the needs of the separate tetrapods.

The Korean Patent Registration No. 374,181 discloses a tide permeable breakwater which comprises a base placed at the sea bottom, a plurality of culverts provided on the top of the base along the total length of the breakwater so that the seawater passages in a width direction may be arranged, a plurality of breakwater modules arranged on the upper surface of the culverts toward the open sea so as to form the slope, on which tetrapods are mounted, and a plurality of the hollow blocks vertically arranged on the harbor side surface of the culverts, of which the top portions are covered with a cap concrete.

However, there are problems that the construction method of the permeable upright breakwater is complicated and the permeablity of the tide is very limited.

Also, since the both conventional breakwater were constructed by using an upright structure or a bubble mound type, such structures have a common problem that a destruction of a portion of the breakwater is led to the consecutive destruction of the total breakwater.

DISCLOSURE OF INVENTION

Technical Problem

Accordingly, an object of the present invention is to provide a prefabricated breakwater that realizes the free permeability of the ocean currents for a prevention of marine pollutions together with the wave dissipation function.

Another object of the present invention is to provide a prefabricated breakwater that is assembled with facility and maintained by mutual engagement of elements without separate connecting means.

Additional advantages, objects, and features of the invention will be set forth in part in the description which follows and will become apparent to those having ordinary skill in the art.

Technical Solution

According to the present invention, the foregoing and additional objects are attained by providing a prefabricated breakwater, which comprises a plurality of unit blocks which are assembled in a hexagonal structure with sea water passage formed, each of which has a plurality of engaging grooves at the top and bottom thereof, the unit blocks assembled by engaging the grooves with those of the adjacent unit blocks, a plurality of wave dissipating blocks with at least one engaging groove at the upper and lower ends or at the right and left side ends, the dissipating blocks assembled to the cubic block assembly in a stepped manner with the higher height towards the open sea, a plurality of the cubic block assemblies connected to form a breakwater.

On the top of the prefabricated breakwater are formed an upper plate block of ferroconcrete, the lower ends of the cubic block assembly are anchored to a seabed to stand the higher and stronger wave.

Moreover, it is preferable that the dissipating blocks are assembled to the side walls of the cubic block assembly from the top to the three quarters height thereof, so that a sea water passage may be formed at the remaining lower quarter portion.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Figure 1:
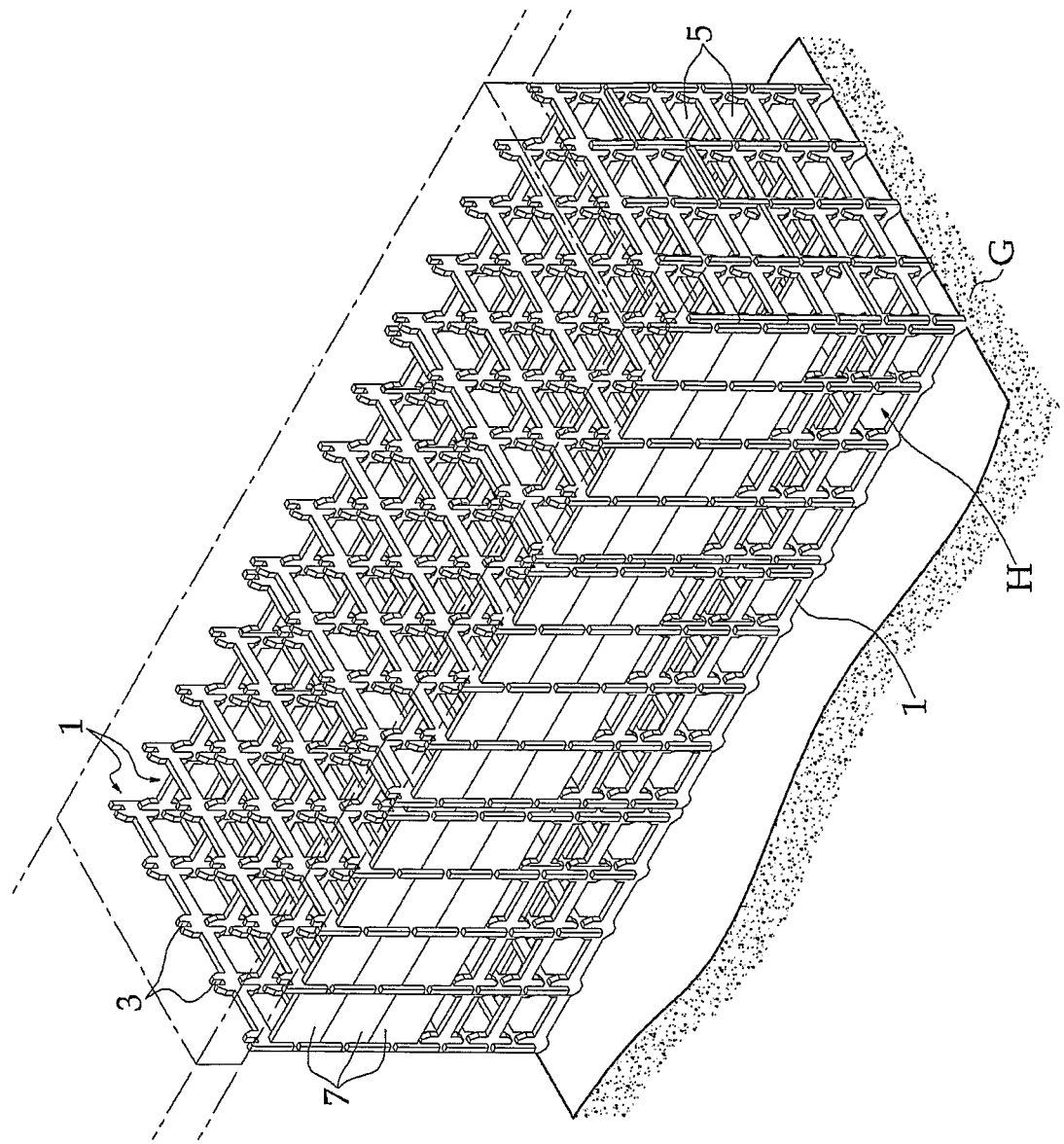
FIG. 1 is a schematic perspective view diagram showing the prefabricated breakwater according to the present invention.
Figure 2:
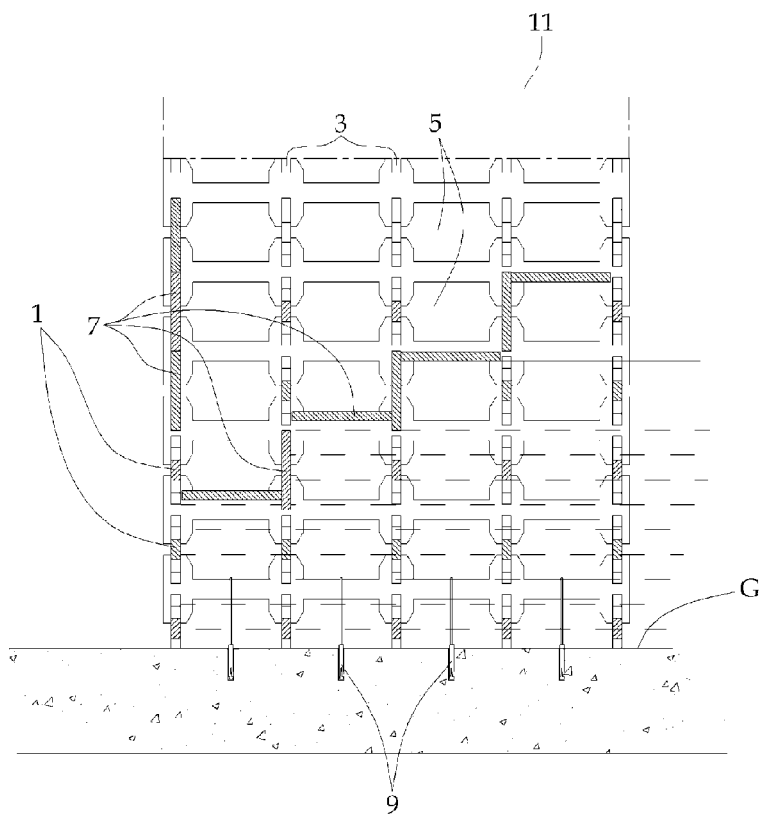
FIG. 2 is a sectional view of the breakwater in FIG. 1.
Figure 3:
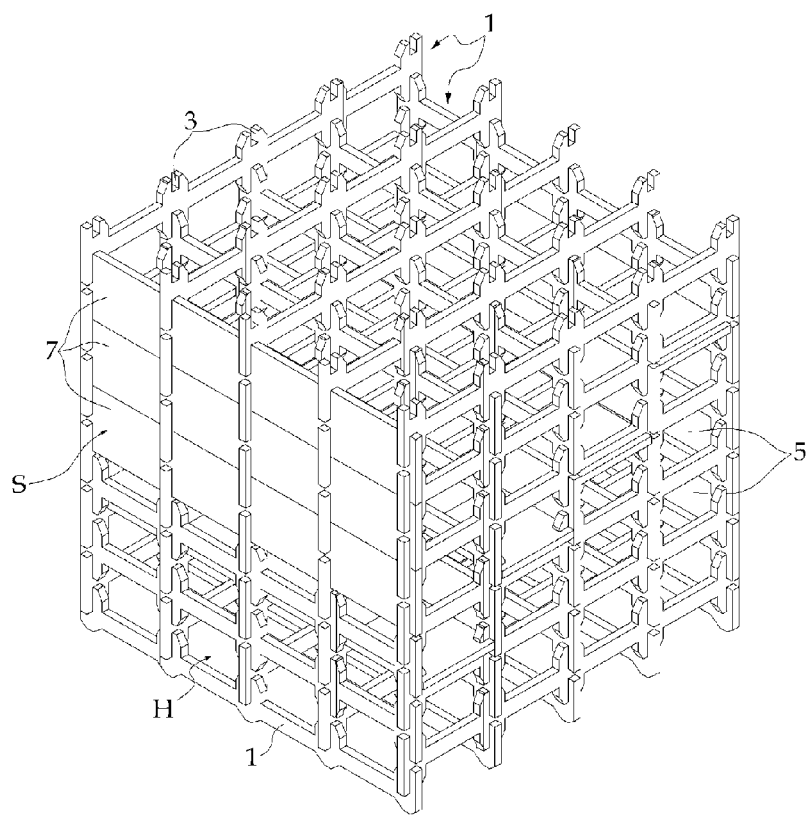
FIG. 3 is an enlarged view showing the cubic block assembly for the breakwater according to the present invention.
Figure 4:
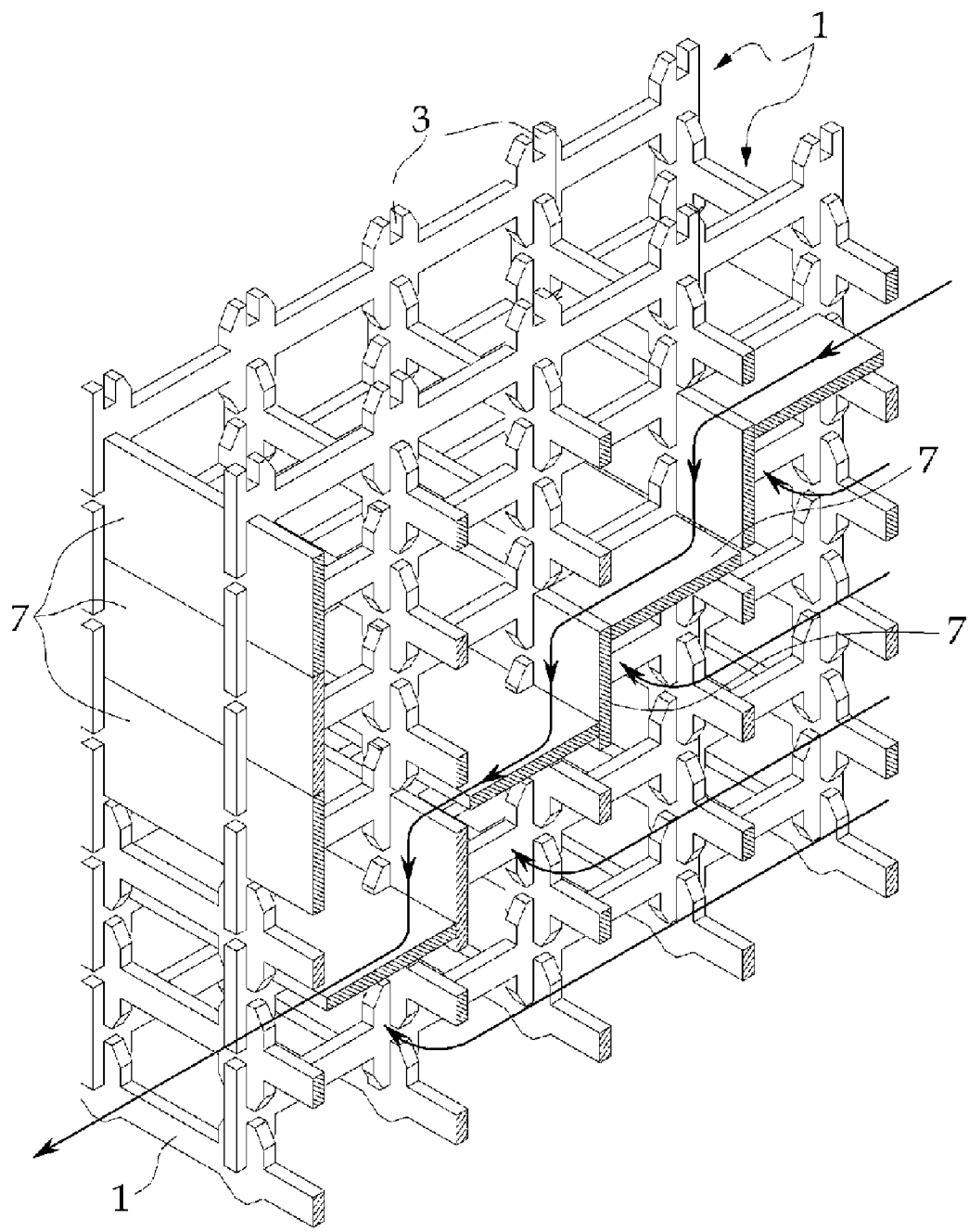
FIG. 4 is a cutout perspective view of the cubic block assembly in FIG. 3.

FIGS. 1 and 2 are perspective views showing a breakwater according to the present invention and FIGS. 3 and 4 show an cubic block assembly as an unit for the breakwater.

As shown in the drawings, the prefabricated breakwater according to the present invention is easily assembled by the engagement of a plurality of unit blocks without separate coupling elements.

For this purpose, the present invention provides a unit block 1 which is elongated to, for example about 5-15 m long with a rectangular sectional shape.

As shown in FIG. 3, the unit blocks 1, each of which has a plurality of engaging grooves 3 formed at the top and bottom thereof at a constant distance, are connected by engagement of the grooves of the adjacent unit blocks 1 in the crosswise and longitudinal directions, whereby a cubic block assembly is formed with a plurality of openings 5 for smooth sea water flowing, which is different from the conventional blocks.

The area of the openings 5 for the sea water flowing at the cubic block assembly may be controlled by adjusting the height and distance of the grooves of the unit block 1.

The cubic block assemblies are connected to form the breakwater of the present invention, but its dissipating function is not sufficient.

Considering this point, according to the present invention, a plurality of dissipating blocks 7 in a plate shape, which has at plurality of engaging grooves 3 formed at a constant distance, are provided to the cubic block assembly.

Particularly, as shown in FIGS. 2 and 4, the dissipating blocks 7 are assembled to the cubic block assembly in a stepped manner to be higher in the direction of the open sea, so as to form the first dissipating wall (S1).

Furthermore, the dissipating blocks 7 are assembled to the inland side of the cubic block assembly to form the second dissipating wall (S2). The dissipating blocks 7 are not provided at the lower portion of the cubic block assembly for the smooth flowing of sea water. The dissipating blocks 7 are assembled to the cubic block assembly except a lower quarter of the cubic block assembly. Accordingly, the lower portion of the cubic block assembly is provided with the unit blocks 1 only, but the dissipating blocks 7 are provided at the upper part of the second dissipating wall (S2).

Therefore, as shown in FIG. 2, the prefabricated breakwater according to the present invention may successively blocks the underwater wavelength of the wave surged from the open sea by the first dissipating wall (S1). Thus, the higher wave may flow over the first dissipating wall (S1) and the lower wave is dissipated by the first dissipating wall (S1) to flow through the lower current passage (H).

Moreover, the second dissipating wall (S2) is formed at the upper portion of the inland sea side wall of the cubic block assembly and the current passage (H) is formed at the lower portion thereof, whereby the sea water in the open sea and inland sea may be smoothly circulated. Therefore, the serious problems of the marine pollutions caused by the deposition of garbage to the seabed and the deterioration of beaches may be prevented.

The unit blocks 1 and dissipating blocks 7 according to the present invention may be transported and assembled at the working place and the assemblies may be dropped there. Accordingly, the working for the construction of the breakwater may be performed safely and quickly.

The cubic block assemblies may be connected in the desired shape to form the breakwater of the present invention (see FIG. 1).

The embedded lower end of the cubic block assemblies may be anchored at the seabed (G) by the anchor bolts 9 to stand the higher and stronger wave and the ferroconcrete plates 11 are applied at top of the cubic block assemblies so to be used as a road or a footway.

It is preferred that a foundation is provided at the sea bed (G) for the breakwater, which may be formed in a trapezoidal shape or by stacking ripraps.

INDUSTRIAL APPLICABILITY

Accordingly, the breakwater according to the present invention may be firmly, safely and easily constructed by assembling the prefabricated unit blocks and dissipating blocks at the working place.

Furthermore, the breakwater of the present invention allows the smooth current circulation, thereby preventing the serious problems of the marine pollutions caused by the deposition of garbage to the seabed and the deterioration of beaches. Also, the breakwater of the present invention provides a good habitation for the marine livings.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

The invention claimed is:

1. A prefabricated breakwater for wave dissipation, which comprises a plurality of unit blocks, each of which has engaging grooves at constant distance at the top and bottom thereof; said unit blocks being assembled to form a current passage;

dissipating blocks in a plate shape having a plurality of engaging grooves at the top and bottom sides thereof at the constant distance;

said unit blocks and dissipating blocks being assembled in a crosswise and longitudinal directions to form a cubic block assembly;

said dissipating blocks being assembled in a stepped manner so as to be higher in an open sea direction; and said cubic block assemblies being connected to form a breakwater.

2. A prefabricated breakwater according to claim 1, wherein the dissipating blocks are assembled at the inland side wall of the cubic block assemblies from the top to the three quarters height thereof, so that a sea water passage may be formed at the remaining lower quarter portion.

3. A prefabricated breakwater according to claim 1, wherein the cubic block assemblies may be anchored at the seabed by the anchor bolts.

4. A prefabricated breakwater according to claim 1, further comprising a ferro-concrete plate at top of the cubic block assembly.

\* \* \* \* \*